Aug. 22, 1961     A. F. BAUER     2,997,347
BEARING CAP FOR INTERNAL COMBUSTION ENGINES
Filed May 21, 1959     2 Sheets-Sheet 1

INVENTOR.
Alfred F. Bauer
BY
ATTORNEYS

Aug. 22, 1961  A. F. BAUER  2,997,347
BEARING CAP FOR INTERNAL COMBUSTION ENGINES
Filed May 21, 1959  2 Sheets-Sheet 2
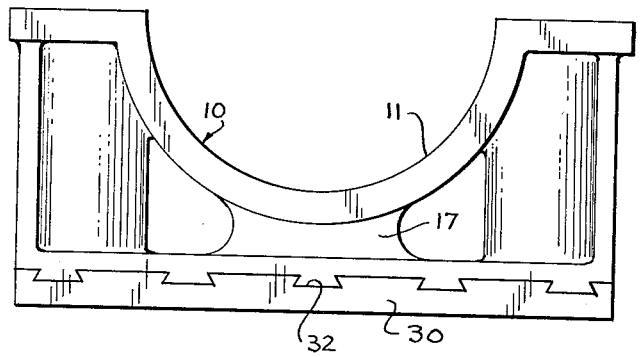
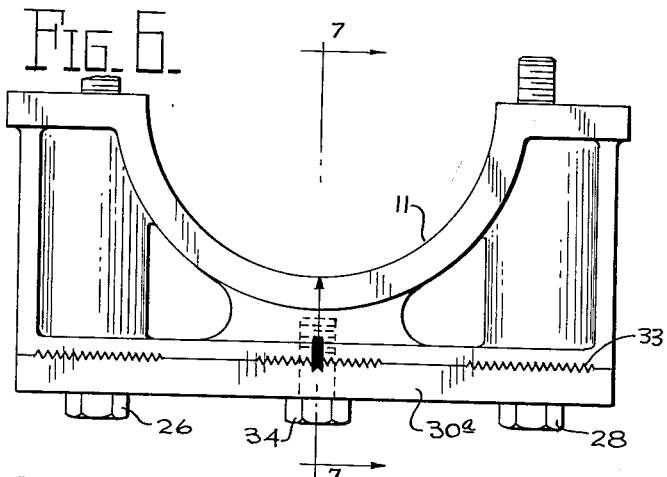
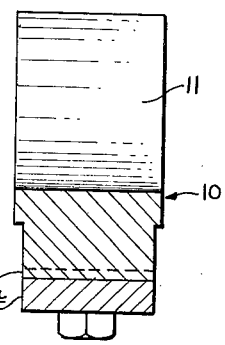
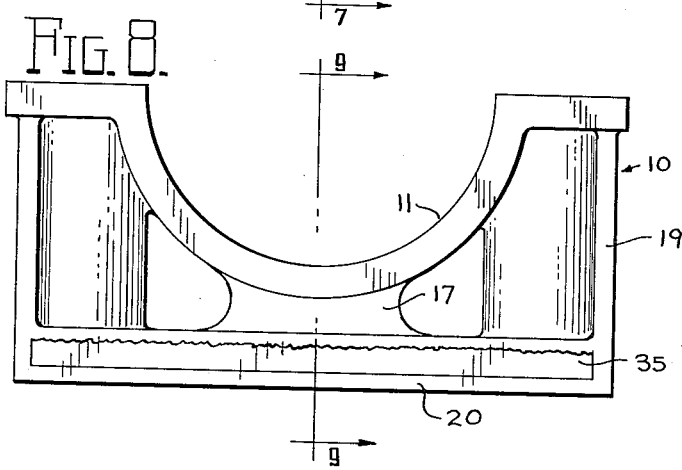
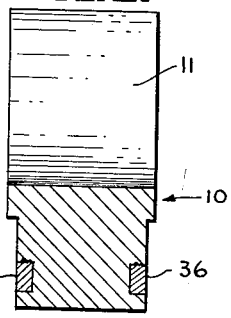
INVENTOR.
Alfred F. Bauer
BY
Owen & Owen
ATTORNEYS United States Patent Office 2,997,347
Patented Aug. 22, 1961

2,997,347
BEARING CAP FOR INTERNAL COMBUSTION ENGINES
Alfred F. Bauer, Toledo, Ohio, assignor to National Lead Company, New York, N.Y., a corporation of New Jersey
Filed May 21, 1959, Ser. No. 814,856
10 Claims. (Cl. 308—23)

This invention relates to bearing caps for internal combustion engines and is particularly directed to a bearing cap for light metal alloy engines constructed to compensate for differential thermal expansion of the engine crankshaft and the retaining caps for the bearings in which such crankshaft is journaled.

In the development of internal combustion engines made almost entirely from light metal alloys, one of the more serious problems has been found to result from the differential expansion of a steel crankshaft and the supports for its main bearings. Where both the engine block and the main bearing caps are of light metal having a high coefficient of thermal expansion, the clearance around a steel crankshaft becomes so great when the engine is hot that the engine becomes noisy. One solution to the problem has been to cool the lubricating oil and flood large quantities of the cooled oil through the bearings to maintain low temperatures and thus low expansion of the parts. This solution, however, requires a larger than usual oil pump as well as some means to extract heat from the oil. This is not an acceptable practice where economy of construction and operation of the engine are important.

The present invention provides a satisfactory solution to the expansion problem by providing a bearing cap which compensates for the greater thermal growth of the light metal alloy by imposing a thermally derived force on the structure acting in a direction towards the center of the journaled shaft.

It is the primary object of the present invention to provide a bearing cap for an internal combustion engine which utilizes the difference in thermal expansion properties of dissimilar metals to compensate at least in part for the dimensional changes in a bearing cap resulting from an increase in its operating temperature.

It is a further object of the invention to provide such a bearing cap wherein different thermal expansion characteristics of a main body of a light metal alloy and of a second metal body fixed thereto cause, upon heating of the bearing cap, a bending of the main body in a direction to compensate for the dimensional change brought about by thermal expansion thereof.

Other objects and advantages of the invention will become apparent from the following detailed description thereof, reference being made to the accompanying drawings, in which—

FIGS. 5 and 6 are side elevational views of further modifications;

FIG. 7 is a cross-sectional view taken on line 7—7 in FIG. 6;

FIG. 8 is a side elevation of a further modification; and

FIG. 9 is a section on line 9—9 in FIG. 8.

Figures 1, 2, 3, 4:
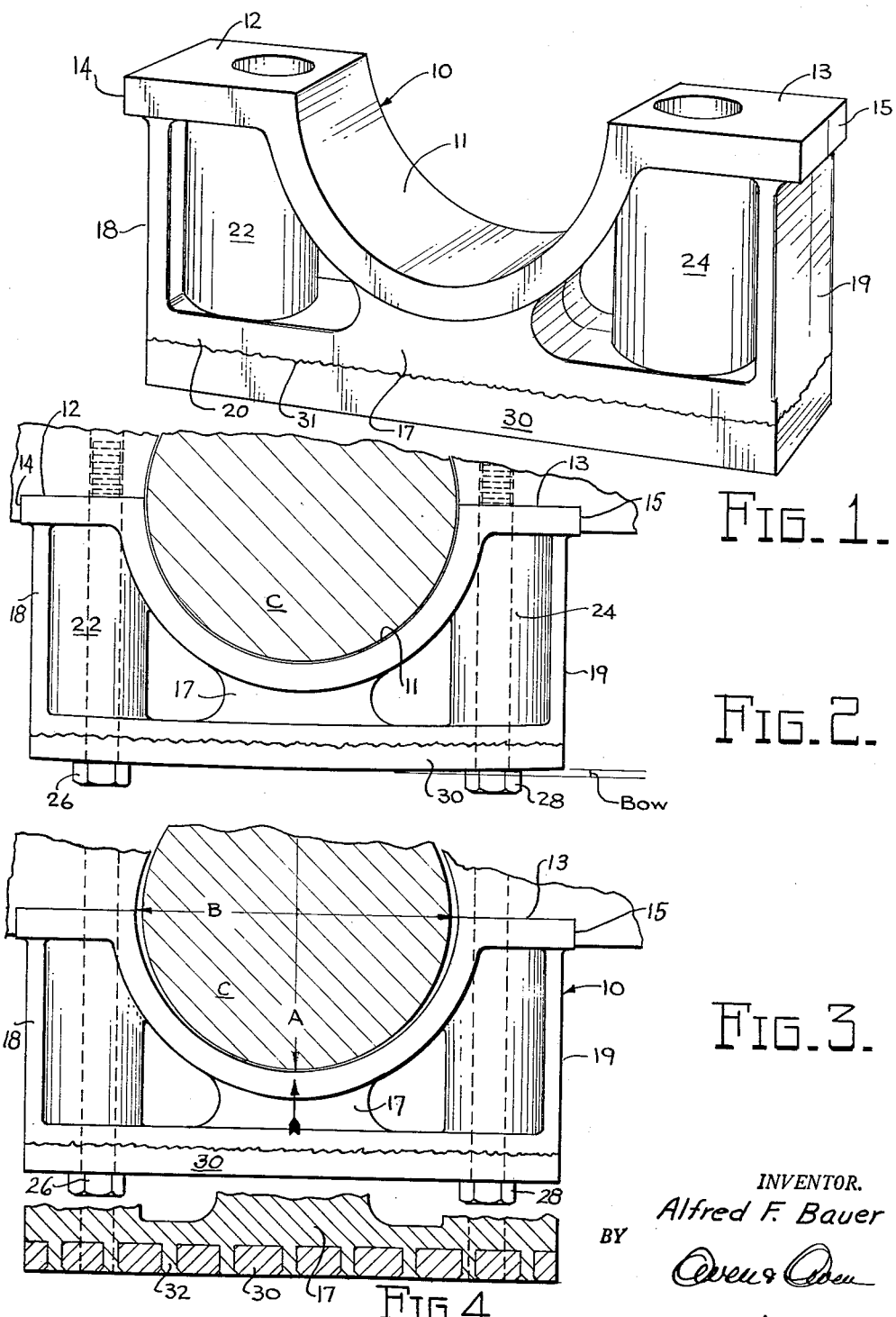
FIG. 1 is a perspective view of a bearing cap embodying the present invention.
FIG. 2 is a diagrammatic side elevational view of the bearing cap associated with an engine block and crankshaft, both shown fragmentarily and in section.
FIG. 3 is a side elevational view similar to FIG. 2 with the parts shown in the relationship assumed upon heating.
FIG. 4 is a fragmentary side elevational view of a modified form of the invention.

The present invention comprises a bearing cap including a main body of a light metal alloy and a second body of a metal having different thermal expansion characteristics fixed thereto. The second body so cooperates with the main body that upon heating of the bearing cap the different thermal expansions of the two bodies cause a change in stress at the contact between the two bodies. The change in stress results in a bending of the main body in a direction to compensate for the dimensional change brought about by thermal expansion thereof.

A bearing cap constructed in accordance wtih the present invention comprises a body 10 of light metal alloy having a central bearing-receiving opening 11 terminating in finished, diametrically opposed seating surfaces 12 and 13. In some instances it is desirable to finish the outer ends 14 and 15 of the surfaces 12 and 13 to establish an accurate width for the bearing cap and to engage these surfaces with mating surfaces formed in the engine block as indicated in FIGURE 2. Whether these surfaces are used to locate the center of the bearing-receiving opening with respect to the block, or whether the retaining bolts are used for this purpose is immaterial to the practice of the present invention.

The body 10 includes a relatively heavy lower center strut member 17 and side struts 18 and 19 all cast or formed integrally with a backing or lower base portion 20 extending from side to side of the body 10. Additional hollow strut elements 22 and 24 are provided which receive bearing cap locating and fastening bolts 26 and 28 in the conventional manner. The bolts 26 and 28 are threaded into the engine block and are drawn down to a specified tightness in the usual installation.

In the form of the invention shown in FIGS. 1 to 3 a second body 30 of a metal having a lower coefficient of thermal expansion is fixed to the body 10 at an area remote from the bearing-receiving opening 11, at least spanning such opening, and preferably extending across the entire lower side of the base portion 20. If the main body 10 is an aluminum alloy, the second body may conveniently be made of a ferrous metal such as cast iron having a coefficient of thermal expansion of about half that of the aluminum alloy. Aluminum alloys in general have a coefficient of thermal expansion of about $13 \times 10^{-6}$ in./in./°F. while ferrous metals in general have a coefficient of thermal expansion of about $6.5 \times 10^{-6}$ in./in./°F. Other metals of different expansion characteristics may be used for the second body 30 as will become apparent hereinafter.

The joining of the main body 10 and the second body 30 may be accomplished in various ways. It is necessary that the two bodies be so interlocked that they cannot slide relative to each other so that the light metal alloy cannot expand without imparting a significant stress to the second body 30, or without changing a residual stress that may be present at the contiguous surface of the two bodies. If the light metal alloy is a die cast aluminum part, satisfactory interlocking of the surfaces of the two bodies will result from casting the aluminum under high pressure onto a rough, pitted and undercut surface of the ferrous body 30 as fully described in my copending application Serial No. 749,017, and as indicated at 31 in FIGS. 1, 2 and 3. Die casting the aluminum against the pitted and undercut surface of the ferrous body 30 causes the aluminum to be forced under high pressure into intimate and complete interlocking engagement with the surface of the ferrous body.

The two bodies 10 and 30 may also be satisfactorily interlocked by drilling a number of spaced holes through the ferrous body 30, inserting the drilled piece in a die and casting the body 10 so that the light metal of the first body enters and fills the holes as indicated at 32 in FIG. 4.

Slots 33 milled across the face of the ferrous body 30 may also be used as shown in FIG. 5, and the slots may be undercut if desired. In any of the forms so far described the light metal alloy of the body shrinks after casting, upon cooling, and sets up a high compressive stress in the interlocked continuous surface of the ferrous body 30, and a corresponding tensile stress in the light metal alloy body 10. This stress has been found to be sufficient to bow a ⅜" iron bar to such an extent that the center thereof, underlying the center of the bearing-receiving opening, is about .030" to .040" higher than the ends when the parts are at room temperature. In FIG. 2 of the drawings the bowed condition of the body 30 is exaggerated and is indicated by a legend.

Bearing caps of the type described are conventionally used as main bearings to journal steel crankshafts, and the desired radial clearance is about .001". If a steel crankshaft were supported in a conventional iron or steel bearing cap, the two parts would expand together since both have a coefficient of thermal expansion of about $6.5 \times 10^{-6}$ in./in./° F. However, in the light metal engine, light metal bearing caps expand at about twice the rate of the crankshaft and the clearance around the crankshaft increases. A radial clearance of .003" to .004" will result in a noisy bearing and loss of oil pressure if this clearance exists around the entire circumference of the bearing. In the absence of the compensating means of the present invention, such undesirable increased clearance would be established. However, if the bearing assumes an oval shape with a clearance of .001" or .002" in the direction of a diameter A (FIG. 3) which may coincide with the axis of the engine cylinders, a clearance of .003" to .004" may be tolerated in a perpendicular direction, or along a diameter B. The present invention provides means to maintain the desired close clearance in the desired direction.

When a bearing cap comprising dissimilar metals as mentioned above and constructed as described is heated to normal engine operating temperatures (about 200° to 300° F.) the light metal alloy body 10 expands more than the second body 30. This differential expansion results in a partial release of the stress at the interface between the bodies 10 and 30 and a corresponding relaxation of the bending of the ferrous bar member 30 which results in a force upwardly at the center of the member. The central area of the bearing cap is thus forced upwardly in the direction of the arrow in FIG. 3 to such an extent that the expansion on the diameter A is partially or entirely compensated by the bending of the body 10. While the expansion of the bearing along a diameter B perpendicular to diameter A is not compensated, the very substantial compensation that occurs at the central area is sufficient to keep the bearing from becoming noisy in operation and from developing so much clearance that the engine would lose oil pressure. In FIG. 2 of the drawings the bearing cap is shown in the "cold" condition with uniform clearance (exaggerated) around a crankshaft indicated at C. In FIG. 3, the bearing cap of the present invention is shown in the heated condition with the clearances again exaggerated to show a small clearance along the diameter A and a larger clearance along the diameter B. The degree of bending of the main body 10 is controlled by the relative coefficients of thermal expansion of the two metals that comprise the body 10 and the compensating member 30, as well as by the length and thickness of the member 30. The stress at the joining surfaces must impart a deformation of both parts 10 and 30, and the thickness of the ferrous body 30 is chosen with relation to the mass and configuration of the body 10 to accomplish this. If the compensating body 30 is made too thick it will not be deformed by the available stress, and if it is made too thin it will buckle and fail as the aluminum shrinks or expands. The lower the coefficient of expansion of the attached compensating body 30 the greater will be the stress imposed on the joining surfaces and the greater will be the bending resulting from a given temperature change. It is, of course, necessary that the stresses set up in both the light metal alloy body and in the attached compensating body 30 shall be less than the fatigue endurance limits of the materials inasmuch as the compensating action of the bearing cap must be repetitive throughout the life of the engine in which it is installed.

A modification of the invention comprises the attachment of the body 30 having the lower coefficient of expansion to the light metal body 10 when both parts are at room temperature. The fastening or attachment may be made by rivets, screws, or other means and the contiguous surfaces of the two bodies may be formed with mating serrations, tongues and grooves or other projections to prevent a relative sliding movement and to assure that a stress will be set up by differential expansion when the parts are heated in use. FIGURE 6 of the drawings shows a construction in which the body 10 is provided with spaced series of serrations 33 extending laterally across the lower face of the lower base member 20. The serrations occur at least at these points to which the strip of lower expanding metal, designated 30a, will be subsequently attached. The compensating strip 30a is similarly serrated at the corresponding areas and to the corresponding extent. When the two parts are laid together an interference fit between the serrated sections can be brought about by tightening the main fastening and locating bolts 26 and 28 and by threading the lower center strut member 17 to receive a third, central bolt 34. The clamping action of the three bolts is sufficient to bring the two parts into such intimate relationship that no relative sliding movement will take place, and when the bearing cap is heated a high tensile stress will be imposed on the upper face of the attached compensating strip 30a. This tensile stress will bow the strip 30a upwardly in the direction of the arrow and will compensate for the thermal expansion of the bearing cap in a manner similar to that previously described. In this instance, however, the change in stress in the attached compensating strip is from zero to a relatively high tensile value, whereas in the previously described forms the change in stress in the member 30 was from a high compressive value to a lower compressive value.

A further modification of the invention is shown in FIG. 8. In this form, the member having the relatively lower coefficient of thermal expansion comprises strips of metal 35, 36 attached to the sides of the light metal alloy body 10. The strips 35, 36 span at least the bearing-receiving opening 11 and are fixed in place by any of the expedients previously described, the surface interlock type being shown. The operation of this form is the same as the previously described forms in that a change in the stress conditions at the contiguous surfaces of the dissimilar metals causes a bending force to be applied upwardly on the center area of the bearing cap to compensate at least in part for the thermal expansion of this area away from the journaled shaft.

While the invention has been described in connection with several modifications, other changes and modifications may be made without departing from the scope of the appended claims.

What I claim is:

1. In a bearing cap for supporting a journaled shaft having a relatively low coefficient of thermal expansion, and including a body of light metal alloy having a higher coefficient of thermal expansion than said journaled shaft, whereby heating said shaft and body together causes the body to expand away from said shaft, said body having a bearing-receiving area, the improvement comprising in combination with said body, a member affixed to and in heat conducting contact with said body and having a lower coefficient of thermal expansion than said body, said member and body being joined over an area remote from and spanning said bearing-receiving area whereby differential expansion thereof resulting from heating causes a bending force on said body effective to bend said body in a direction to compensate for its expansion away from the journaled shaft and to improve the elevated temperature fit of the cap relative to the shaft but ineffective to stress either the body or said member beyond its fatigue endurance limits.

2. A bearing cap for supporting a journaled shaft having a relatively low coefficient of thermal expansion comprising, a body having an upper element including spaced seating means and a bearing-receiving opening therebetween, a base member, end strut members joining said upper element seating means and said base member, a center strut member joining said upper element and said base member and underlying said bearing-receiving opening, said upper element and said base member being formed integrally with said strut members of a metal having a relatively high coefficient of thermal expansion, and an expansion compensating member underlying and fixed against all movement relative to said base member, said expansion compensating member being formed of a metal of a relatively lower coefficient of thermal expansion.

3. A bearing cap in accordance with claim 2 in which said expansion compensating member comprises a bar coextensive in each direction with said base member.

4. A bearing cap in accordance with claim 2 in which said expansion compensating member comprises a bar of a ferrous metal coextensive in each direction of said base member.

5. A bearing cap in accordance with claim 2 in which said expansion compensating member comprises a bar of a ferrous metal coextensive in each direction with said base member and fixed to said base member by interlocking projections and recesses in the contiguous surfaces of said bar and base member.

6. A bearing cap in accordance with claim 2 in which said body comprises a die cast aluminum alloy and in which said expansion compensating member comprises a bar of a ferrous metal coextensive in each direction with said base member and fixed to said base member by interlocking projections and recesses in the contiguous surfaces of said bar and base member.

7. In a bearing cap for supporting a journaled shaft having a relatively low coefficient of thermal expansion, the combination of a die cast body of an aluminum alloy having a higher coefficient of thermal expansion than said shaft, said body having a bearing-receiving area, and a ferrous strip member having a pitted and undercut surface joined to said body over an area remote from and spanning said bearing area by intimate contact between substantially all of the pitted and undercut surface of said strip member and the adjacent portions of said aluminum alloy body, the portion of said strip member adjacent said aluminum alloy body being residually stressed in compression and the corresponding surface of said aluminum alloy body being correspondingly stressed in tension, whereby heating of said body and member reduces said residual stress, such change in stress being effective to cause a bending force on said body to bend said body in a direction toward said bearing-receiving area.

8. A bearing cap comprising a body having an upper element including spaced seating areas and a bearing-receiving opening therebetween, a base member, end strut members joining said upper element seating areas and said base member, a central strut member joining said upper element and said base member and underlying said bearing-receiving opening, said upper element and said base member being formed integrally with said strut members of a metal having a relatively high coefficient of thermal expansion, an expansion compensating member underlying and fixed against all movement relative to said base member, said expansion compensating member being formed of a metal of relatively lower coefficient of thermal expansion and being stressed in compression generally along its entire area of contact with said base member, and said base member being correspondingly stressed in tension along such area, the compression on said expansion compensating member being sufficient to cause a bowing thereof so that it is concave toward said bearing-receiving surface, whereby heating of the bearing cap causes a greater thermal expansion of said body than said expansion compensating member and at least a partial stress release and a movement of said compensating member in a direction to reduce its concavity toward said bearing-receiving area and said central strut.

9. A bearing cap for supporting a journaled shaft having a relatively low coefficient of thermal expansion comprising a body having an upper element including spaced seating means and a bearing-receiving opening therebetween, a base member, end strut members joining said upper element seating means and said base member, a center strut member joining said upper element and said base member and underlying said bearing-receiving opening, said upper element and said base member being formed integrally with said strut members of a metal having a relatively high coefficient of thermal expansion, an expansion compensating strip of a ferrous metal having a pitted and undercut surface, and said base member having a surface in intimate contact with substantially all of the pitted and undercut surface of said base member, said base member being stressed in tension generally along its entire area of contact with said compensating member, and said compensating member being correspondingly stressed in compression along such area, the compression on said compensating member being sufficient to cause a bowing thereof so that it is concave toward said bearing-receiving area, whereby heating of the bearing cap causes a greater thermal expansion of body portion than of said ferrous compensating member, and at least a partial stress release and a movement of said compensating member in a direction to reduce its concavity toward said bearing-receiving area and a corresponding movement of said base member and central strut.

10. A bearing cap for supporting a journaled shaft having a relatively low coefficient of thermal expansion comprising, a die-cast body having a metallic bearing-supporting portion of higher coefficient of thermal expansion than said shaft, and a temperature compensating portion integral therewith, said bearing-supporting portion including a bearing-receiving area in its upper face, and said temperature compensating portion having a relatively lower coefficient of thermal expansion and being disposed at an area remote from said bearing-receiving area and spanning said area, the inner face between said temperature compensating portion and said bearing-supporting portion being under residual stress due to the difference in coefficients of thermal expansion, whereby heating of said body reduces said residual stress, such change in stress being effective to cause a bending force on said bearing-supporting portion to bend said bearing-supporting portion in a direction toward said bearing-receiving area.

References Cited in the file of this patent

UNITED STATES PATENTS 2,324,676   Butterfield _____ July 20, 1943

FOREIGN PATENTS 712,307   Great Britain _____ July 21, 1954